US006925463B2

(12) United States Patent
Bhattacharjee et al.

(10) Patent No.: US 6,925,463 B2
(45) Date of Patent: Aug. 2, 2005

(54) METHOD AND SYSTEM FOR QUERY PROCESSING BY COMBINING INDEXES OF MULTILEVEL GRANULARITY OR COMPOSITION

(75) Inventors: Bishwaranjan Bhattacharjee, Yorktown Heights, NY (US); Leslie A. Cranston, Toronto (CA); Matthew A. Huras, Ajax (CA); Tony Wen Hsun Lai, Toronto (CA); Timothy R. Malkemus, Round Rock, TX (US); Sriram K. Padmanabhan, Briarcliff Manor, NY (US); Kaarel Truuvert, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 10/122,460

(22) Filed: Apr. 15, 2002

(65) Prior Publication Data

US 2003/0195869 A1 Oct. 16, 2003

(51) Int. Cl.⁷ .............................................. G06F 17/30
(52) U.S. Cl. ........................................................ 707/3
(58) Field of Search .................... 707/1–10, 100–104.1, 707/200–206; 711/202

(56) References Cited

U.S. PATENT DOCUMENTS

| 4,325,120 | A | * | 4/1982 | Colley et al. ................. 711/202 |
| 5,890,151 | A | * | 3/1999 | Agrawal et al. ................. 707/5 |
| 5,905,985 | A | * | 5/1999 | Malloy et al. ............... 707/100 |
| 5,918,225 | A | * | 6/1999 | White et al. ..................... 707/3 |
| 5,926,820 | A | * | 7/1999 | Agrawal et al. ............. 707/200 |
| 5,943,677 | A | * | 8/1999 | Hicks .......................... 707/205 |
| 5,978,796 | A | * | 11/1999 | Malloy et al. .................. 707/3 |
| 6,490,593 | B2 | * | 12/2002 | Proctor ........................ 707/102 |
| 6,542,895 | B1 | * | 4/2003 | DeKimpe et al. ........... 707/101 |
| 6,549,907 | B1 | * | 4/2003 | Fayyad et al. .............. 707/101 |
| 6,768,986 | B2 | * | 7/2004 | Cras et al. ...................... 707/2 |

OTHER PUBLICATIONS

K. V. Ravi Kanth et al., Indexing Medium–dimensionality Data in Oracle,Jun. 1999, ACM SIGMOD Record , Proceedings of the, 1999 ACM SIGMOD international conference on Management of data, vol. 28 Issue 2, pp. 521–522.*

Sriram Padmanabhan et al. Industrial track session 2: server technology: (IBM) Mulit–dimensional clustering: a new data layout scheme in DB2, Jun. 2003, Proceedings of the 2003 ACM SIGMOD international conference on Management of data, pp. 637–641.*

Jayavel Shanmugasundaram et al., Compressed data cubes for OLAP aggregate query approximation on continuous dimensions, 1999; Proceedings of the fifth ACM SIGKDD international, con Knowledge discovery and data mining Conf of Knowledge, pp. 223–232.*

* cited by examiner

Primary Examiner—Diane D. Mizrahi
(74) Attorney, Agent, or Firm—F. Chau & Associates, LLC

(57) ABSTRACT

A method to process a query for information stored in a relational database using indexes which have different granularity and/or composition is provided. The method involves selecting indexes of various granularity and/or composition based on the query, ordering and combining them (if necessary) in order to subset the data from a relational table to be optimally scanned. The ability to combine indexes is very useful to answer ad hoc queries for which no specific index exists. This requirement may be met by using index ANDing and index ORing techniques.

38 Claims, 10 Drawing Sheets

METHOD AND SYSTEM FOR QUERY PROCESSING BY COMBINING INDEXES OF MULTILEVEL GRANULARITY OR COMPOSITION

FIELD OF THE INVENTION

The present invention relates generally to database systems and, more particularly, to techniques for processing a query using different types of indexes.

BACKGROUND OF THE INVENTION

Relational Database Management Systems (RDBMS) are well known in the art. An RDBMS is a database management system (DBMS) which uses relational techniques for storing and retrieving information. Relational databases are organized into tables that include rows and columns of data. A database will typically have numerous tables and each table will usually have multiple rows and columns. The tables are typically stored on direct access storage devices (DASD) such as magnetic or optical disk drives for semi-permanent storage.

Records of a database table can be accessed using an index when searching for a particular column value or range of values. An index is an auxiliary data structure that identifies a subset of the records in the table for any given key value. An index key is usually a column or an ordered set of columns of the table. A record-based index maintains record identifiers (RIDs) for each index key value. Hence, they provide a quick method to access the specific subset of records for any given key value. Without an index, finding a record would be more difficult and time-consuming. It would involve scanning an entire table for the value or range of values. Thus, indexes provide an alternate technique to sequential scanning, and can be quite useful if they are defined on keys that are frequently queried. After a table is defined, a user can define one or more indexes by specifying one or more columns of the table as the key for each index. Additionally, several RDBMSs permit a table to be partitioned into one or more subsets of records using partition keys. Record-based indexes can be defined for each partition of the table. Such an index is called a partitioned record index. For any given index key, the partitioned record index only contains RIDs for the records inside the partition that contain the given key value. Record-based indexes can be maintained using several methods. The B-Tree index and Hash index are two popular indexing methods in the current art and are supported by several RDBMSs.

Although record-based indexes and partition-based indexes provide useful ways to access information in a relational database, they have some drawbacks as well. In particular, record-based indexes and partition-based indexes can take up a relatively large amount of storage space, and their processing overhead can be substantial.

SUMMARY OF THE INVENTION

A technique is disclosed for processing a query for information stored in a relational database using indexes which have different granularity and/or composition. The technique involves selecting indexes of various granularity and/or composition based on the query, ordering and combining them (if necessary) in order to subset the data from a relational table to be optimally scanned. The ability to combine indexes is very useful to answer ad hoc queries efficiently for which one specific index is not sufficient. This requirement may be met by using the index ANDing and index Oring techniques described herein.

According to a first aspect of the invention, there is provided a method for processing a query. The method includes the step of obtaining index information for indexes of different types. Information is then retrieved from a relational database using the index information. According to a second aspect of the invention, the indexes used have different granularity. According to a third aspect of the invention, the indexes used have different composition. According to a fourth aspect of the invention, one of the indexes is a block index.

According to a fifth aspect of the invention, the block index is a primary block index. According to a sixth aspect of the invention, the method further includes the step of scanning blocks of data associated with the primary block index for records that match a selection criteria.

According to a seventh aspect of the invention, the block index is a secondary block index. According to an eighth aspect of the invention, the method further includes the step of scanning data associated with the secondary block index for records that match a selection criteria. According to a ninth aspect of the invention, the method further includes the step of checking whether a block to be scanned is a duplicate block identifier and not scanning it in that case.

According to a tenth aspect of the invention, the method further includes the step of performing an index ANDing operation. According to an eleventh aspect of the invention, performing the index ANDing operation includes the steps of building a set of block indicators for a block index, probing the block indicators using a next list of block indicators, building another set of qualifying block indicators using the results of the probe phase, and iterating these steps until there are no more block indexes to process. The method also includes the step of identifying blocks to be processed. According to a twelfth aspect of the invention, the ANDing operation also can process RIDs. In this case, a list of block identifiers would additionally be created in which each block identifier in the list corresponds to a block associated with a record identifier in a list of record identifiers. Then, a set of block indicators would be created corresponding to blocks in the list of block identifiers that are indicated in the last built set of block indicators. Finally, the blocks and records to process would be identified.

According to a thirteenth aspect of the invention, the method further includes the step of performing an index ORing operation. According to a fourteenth aspect of the invention, performing an index ORing operation further includes the steps of obtaining one or more list of block identifiers, combining the one or more list of block identifiers into a combined list, sorting the combined list, and removing duplicate block identifiers from the sorted list along with any block identifiers belonging to blocks of lower level granularity whose corresponding higher granularity block index were also present. According to a fifteenth aspect of the invention, the method further includes the steps of obtaining a list of one or more record identifier, and removing record identifiers from the list where a block identifier associated with a record identifier in the list matches a block identifier contained in the sorted list.

According to a sixteenth aspect of the invention, one of the indexes is a record-based index. According to a seventeenth aspect of the invention, one of the indexes is a partition-based index.

According to an eighteenth aspect of the invention, a query plan may be developed for retrieving information from the database which is based on a cost model.

According to a nineteenth aspect of the invention, at least one table associated with the database is indexed using block indexes having different granularity.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
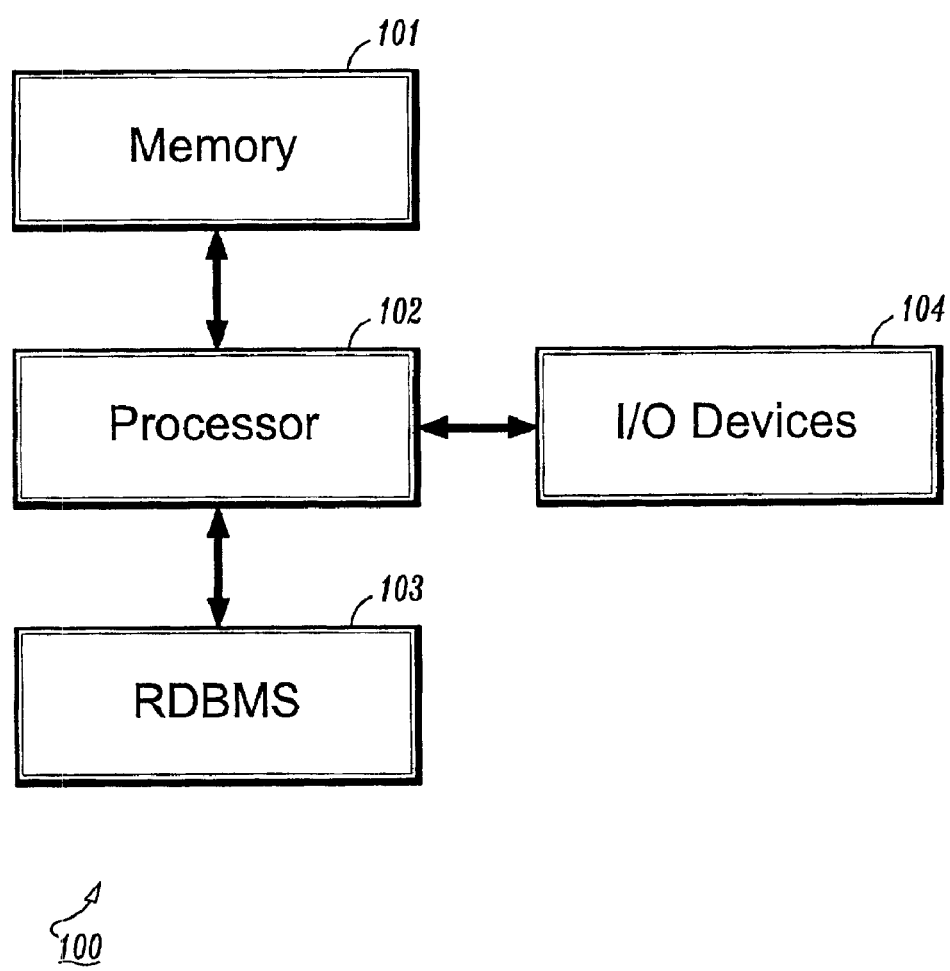
FIG. 1 is a block diagram of an exemplary environment for use with the methodologies of the invention.

First, an environment for processing queries using a relational database management system (RDMS) in accordance with the invention is described in the context of FIG. 1. The system 100 includes a processor 102 coupled to a memory 101, one or more input/output (I/O) devices 104, and an RDBMS 103. It is to be appreciated that the processor 102 can implement the flow diagrams shown in FIGS. 6, 7, 8a–b, and 9. Alternatively, the RDBMS 103 may have its own processor, memory, and I/O device configuration (not shown) to implement the flow diagrams of FIGS. 6, 7, 8a–b, and 9. In this arrangement, the RDBMS 103 can be hosted on a server platform, for example, and the processor 102, the memory 101, and the I/O devices 104 can be associated with the processor 102 in a client system. Of course, one skilled in the art would readily appreciate that there are many other configurations that may be adopted to process queries using the RDBMS 103 without departing from the spirit and scope of the present invention.

Figure 2:
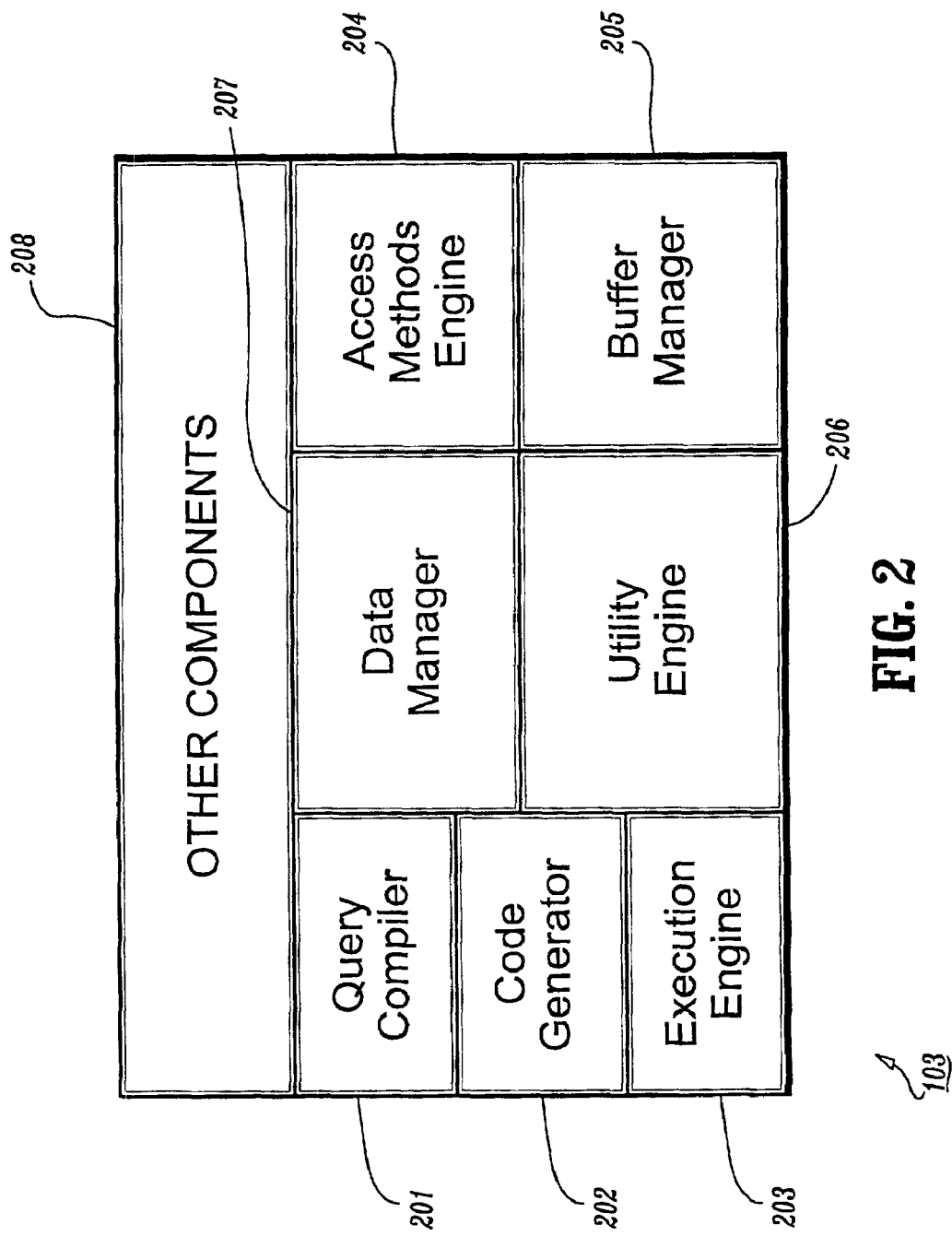
FIG. 2 is a graphical illustration of the exemplary relational database management system of FIG. 1 in accordance with an embodiment of the present invention.

The memory 101 may be used by the processor 102 in performing, for example, storage of information used by the processor 102. The I/O devices 104 may include a keyboard, a mouse, and/or any other data input device which permits a user to enter queries and/or other data to the system 100. The I/O devices 104 may also include a display, a printer, and/or any other data output device which permits a user to observe results associated with queries and/or other processor operations. The RDBMS 103 may contain system software (such as depicted in FIG. 2) to process structured query language (SQL) commands (or other types of queries), including optimizing the SQL commands (or other types of queries) and executing them to obtain information passed back to the processor 102. It is to be understood that the structured data associated with the RDBMS 103 is organized in individual tables, where each table may have a multitude of rows and columns. In a common configuration, an end user using an I/O device 104, such as a standard computer keyboard and/or pointing device, may enter a particular SQL command (or cause the command to be generated). The processor 102 may then receive this command from the I/O device 104, and send it to the RDBMS 103. The RDBMS 103 may then parse the SQL command, optimize the parsed result, and execute it against information associated with the RDBMS. The RDBMS 103 may send a result table back to the processor 102, and the processor 102 may then cause the result table to be displayed to the end user associated with the I/O device 104. It should be appreciated, however, that there are many other ways of interacting with the RDBMS 103. For instance, a computer program running in batch mode may interact with the RDBMS 103 without direct user interaction.

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., a keyboard, for making queries and/or inputting data to the processing unit, and/or one or more output devices, e.g., CRT display and/or printer, for presenting query results and/or other results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Those skilled in the art will recognize that the exemplary environment illustrated in FIG. 1 is not intended to limit the present invention. Those skilled in the art will appreciate that other alternative environments may be used without departing from the spirit and scope of the present invention.

FIG. 2 illustrates the exemplary RDBMS 103. The RDBMS 103 has a query compiler 201, a code generator 202, an execution engine 203, an access methods engine 204, a buffer manager 205, a utility engine 206, a data manager 207, and other components 208.

In preferred embodiments of the present invention, the RDBMS 103 includes the DB2 product offered by International Business Machines Corporation for UNIX, WINDOWS NT, and other systems. It should be appreciated, however, that the present invention has application to any relational database software, whether associated with the DB2 product or otherwise.

In operation, the RDBMS 103 executes on a computer system and may communicate with one or more clients using a network interface, for example. It can also operate in a standalone server mode receiving instructions from a user via commands. Typically, the client/user issues SQL commands that are processed by the RDBMS 103 and results are returned. During operation, the query compiler 201 parses the input SQL commands and uses the code generator 202 to generate an execution plan. The parsed SQL commands are typically transformed into an internal representation and are then optimized. Optimization involves looking at several alternative strategies for obtaining the correct result, and choosing the most efficient strategy. The execution engine 203 interprets and executes the plan and produces the desired results. The execution engine 203 submits requests to the data manager 207 to obtain information from tables. This is done in the manner that was determined by the query compiler 201 (or separate optimizer), using available indexes, scanning tables, etc. The execution engine 203 uses the access methods engine 204 to efficiently access the uderlying database tables that are stored in the access methods engine 204 (or externally thereto). The relevant data items are then retrieved and stored in the buffer manager 205 for reusability of the data. Typically, relational database management systems provide sequential table scan access as well as index-based access to tables. The B-Tree index is the most preferred index technique in RDBMS systems. Optionally, some RDBMS systems allow that the underlying data be clustered and/or partitioned using one or more columns (or index).

In accordance with the present invention, several different types of indexes of various composition and granularity are supported. The indexes that can be combined or used individually are of the following types:

1) Record-Id based indexes where there is an index entry or RID for each record of the parent table. This is called a RID-based index. These include partition-based indexes where the key points to a subset of a RID-based index applicable on that partition. A partition is a part of the table which has the same value for a particular column or columns.

2) Primary block indexes where there is an index entry for every block of data of the parent table. A block is a collection of one or more pages defined by the block size. The block size could vary from a single page to an entire table partition or large chunk of the table. A block is associated with exactly one key value in a primary block index. The block identifier or BID is the index entry associated with the key in the index. It is possible to define multiple block indexes of different granularity on the same columns.

3) Secondary block indexes where there is an index entry for a subset of a block of data of the parent table. Two or more keys might point to the same block of data. A block is a collection of one or more records defined by the block size. It is to be noted that a secondary block index could have particular BID values appearing more than once. This is very different than RID indexes where a RID appears only once in the index.

Indexing techniques using the above types of indexes are also discussed in "Multidimensional Disk Clustering Scheme for Query Processing and Maintenance in Relational Databases," U.S. patent application Ser. No. 10/122,502 filed herewith, which is incorporated by reference herein in its entirety.

In general, the RDBMS 103 software, and the instructions derived therefrom, are all tangibly embodied in a computer-readable medium, e.g., a medium that may be read by a computer system. Moreover, the RDBMS software and the instructions derived therefrom, are all comprised of instructions which, when read and executed by a computer system, causes the computer system to perform the necessary steps to implement and/or use the present invention. Under control of an operating system, the RDBMS 103 software and the instructions derived therefrom, may be loaded from an appropriate data storage device and into memory of a computer system for use during actual operations.

Figure 3:
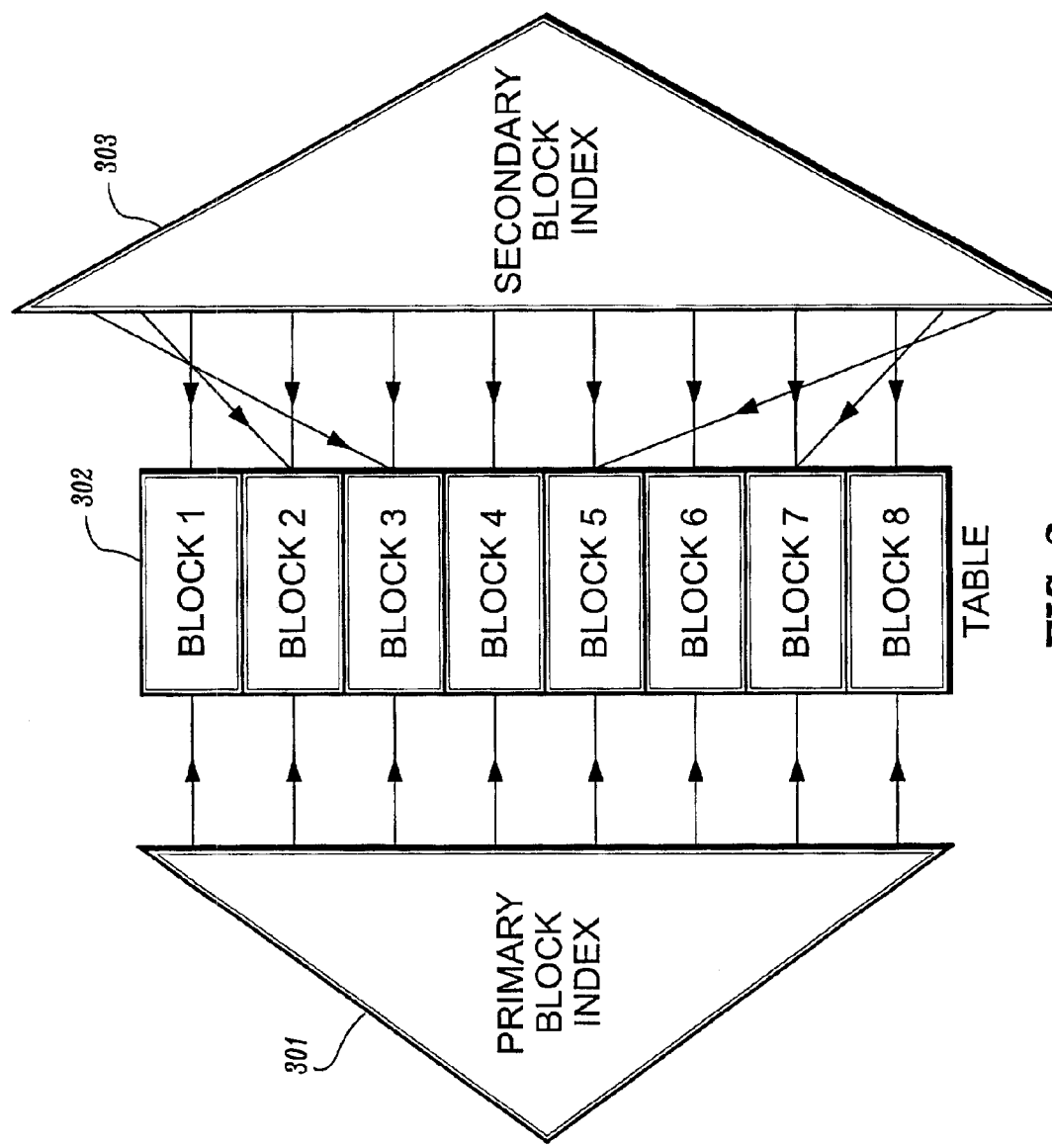
FIG. 3. is a graphical illustration contrasting a primary block index with a secondary block index as discussed in the present invention.

FIG. 3. highlights some of the differences between a primary block index and a secondary block index. An exemplary table 302 is divided into eight blocks numbered sequentially from block 1 to block 8. A primary block index 301 points to BIDs 1 through 8 while a secondary block index 303 points to the BIDs 1 through 8 and also contains duplicate BIDs for the blocks 2, 3, 5, and 7. As mentioned above, a secondary block index can have particular BID values appearing more than once. Thus, secondary block indexes are distinguished in that they can have duplicate BIDs, whereas primary block indexes can only have one entry for each BID.

Figure 4:
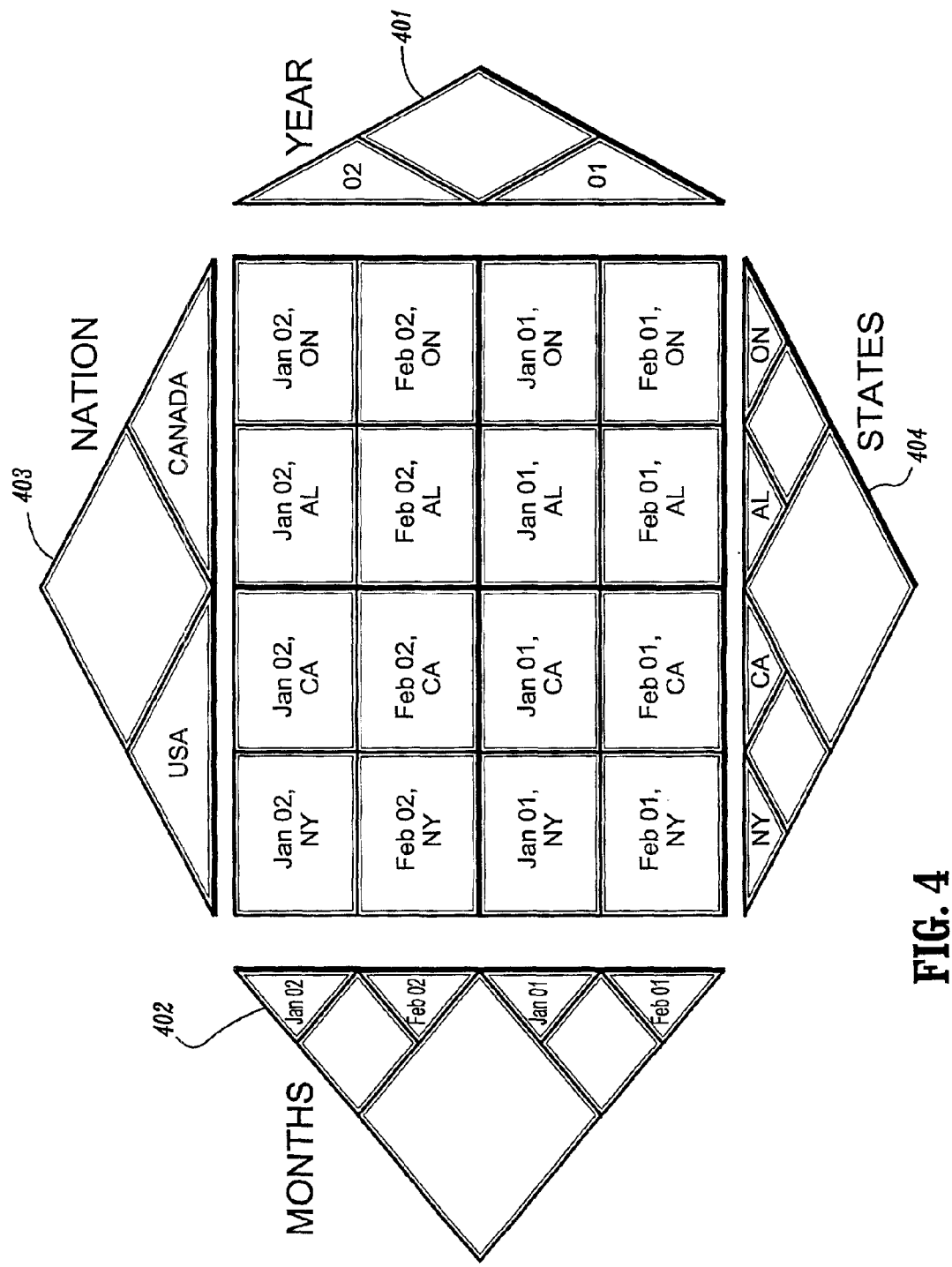
FIG. 4 is a graphical illustration of various exemplary block indexes having multiple levels of granularity as discussed in the present invention.

FIG. 4 illustrates an exemplary table having indexes with multiple levels of granularity. Let us assume that the base table has a column for a date in yyyymmdd format, and that the data in the table was ordered on this date. Then, we could have two block indexes on this date. A block index could be established for 'Year' 401 based on the year of the date (e.g., '2002' and '2001') and another block index could be established for 'Months' 402 based on the month and year of the date (e.g., 'JAN' and 'FEB' of '2002' and 'JAN' and 'FEB' of '2001'). It should be appreciated that the block index for Year 401 would be of higher granularity than the block index for Months 402. Now, consider another column in the table with an address value. If this data was ordered, it could likewise have two indexes of different granularity on them, namely, 'Nation' 403 and 'states' 404.

Furthermore, a block identification scheme may be used to distinguish and identify various levels of granularity. A BID at the highest level of granularity may be assigned an identifier such as 100000 for block 1, for example, then the next lower level of granularity may be given BID values such as 100100, 100200, 100300. The next lowest level of granularity may be given values such as 100101, 100102, 100103, 100201, 100202, 100203, 100301, 100302, 100303. From this convention, it would be easy to relate a lower-level BID to a higher-level BID, and vice versa. For instance, by simply examining the higher-order digits of a BID, it would be possible to determine the higher level block that it belongs to. However, for the examples presented herein, smaller BID values are used for ease of explanation.

Figure 5:
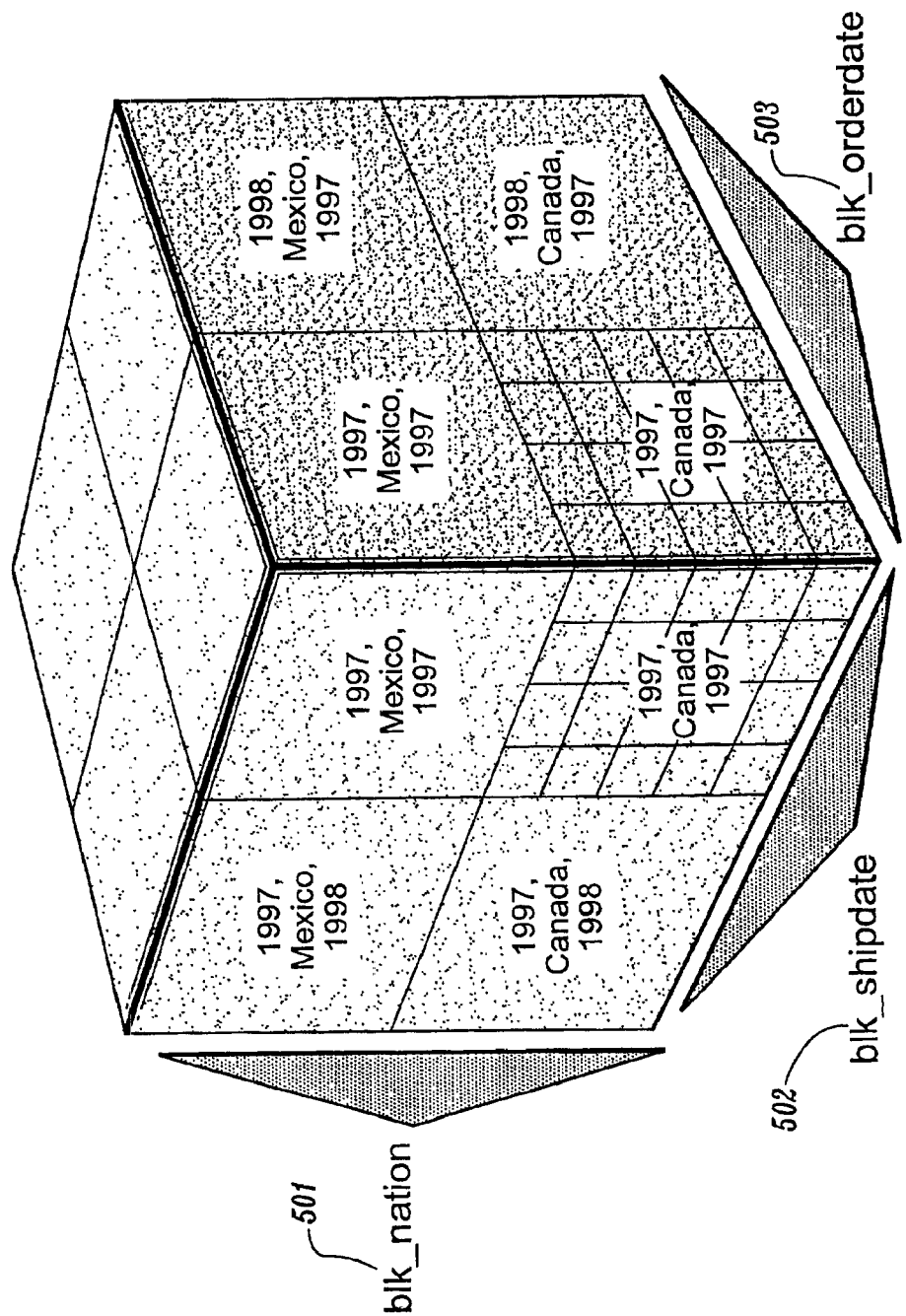
FIG. 5 is a graphical illustration of an exemplary data structure using various types of indexes as discussed in the present invention.

FIG. 5 illustrates an exemplary table with three columns that have primary block indexes. Blk_shipdate 502 is a primary block index for the column "shipdate" which represents when a particular item was shipped, blk_nation 501 is a primary block index for the column "nation" which represents the country from which the item was shipped, and blk_orderdate is a primary block index for the column "orderdate" which represents the date when the item was actually received. Let us assume that "receiptdate" is another column which represents when the item was shipped and "itemnumber" is another column which represents an identifier of the item. Assuming that the table shown in FIG. 5 is clustered on shipdate, nation, and orderdate, then primary block indexes blk_shipdate 502, blk_nation 501, and blk_orderdate can be defined on them. Furthermore, since an item can only be received after it has been shipped, receiptdate will necessarily be correlated to shipdate and may be a good candidate for a secondary block index. A RID index may be set up on itemnumber.

A set of blocks containing pages with all records having a particular key value in a column, will be represented in the associated primary block index by a BID list for that key value.

In the example above, to find the blocks containing all records with 'MEXICO' for the nation column, we would look up this key value in the nation primary block index, and find a key such as this: <MEXICO: 9, 16, 25, 36, 45> where each entry is in the form of a <key value: BID(s)> pair. The key is comprised of a key value, namely 'MEXICO', and a list of BIDs. Each BID contains a block location.

Similarly, to find the list of blocks containing all records having '970101' for the shipdate index, we would look up this value in the shipdate primary block index, and find a key such as this:

<19970101: 2, 16, 25, 41, 65>.

Now, the secondary block index on receiptdate could have the following values:

<19970101: 1, 3, 8, 25, 71>
<19970102: 3, 8, 24, 65, 71>

Please note that two keys values may have the same BID appearing in both of them. In this case, BIDs 3, 8, and 71 appear for both keys '19990202' and '19990203'. This is very different from RID indexes where a RID can appear in only one key for a given index.

The RID index on itemnumber is supported using known techniques in the current art. We now discuss the query processing methods that are facilitated by the present invention. Consider the 3-dimensional (orderdate, nation, shipdate) cube shown in FIG. 5 with respect to the following query:

"Give me all lineitems received in Mexico in 1998 which were ordered in 1997."

This corresponds to the following SQL query:
select orderkey, linenumber
from lineitem
where orderdate>=date('01/01/1997')
and orderdate<date('01/01/1998')
and receiptdate>=date('01/01/1998')
and receiptdate<date('01/01/1999')
and nation in ('Mexico').

Figure 6:
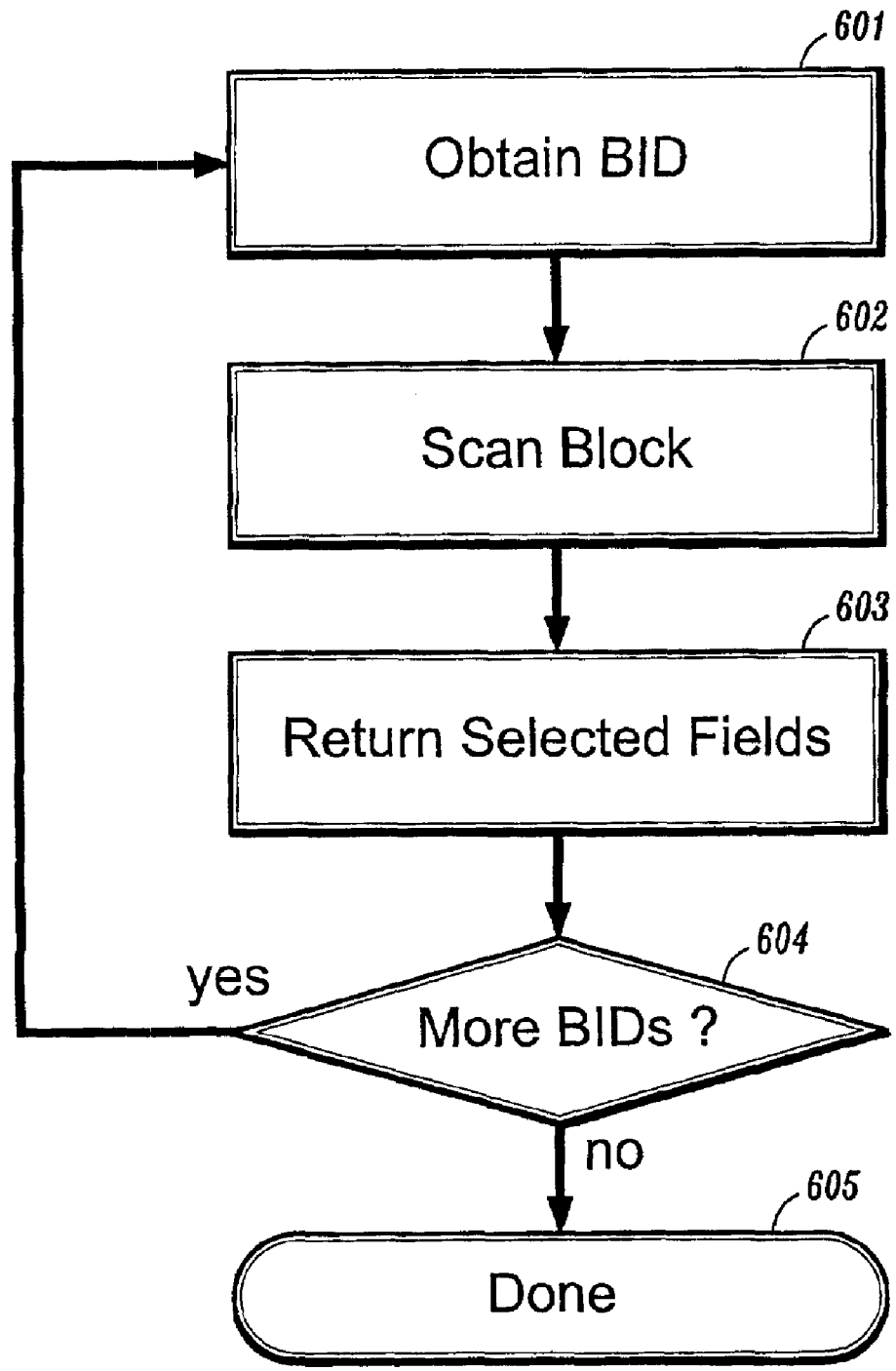
FIG. 6 is a flow diagram outlining an exemplary technique for scanning a table using a primary block index in accordance with an embodiment of the invention.
Figure 7:
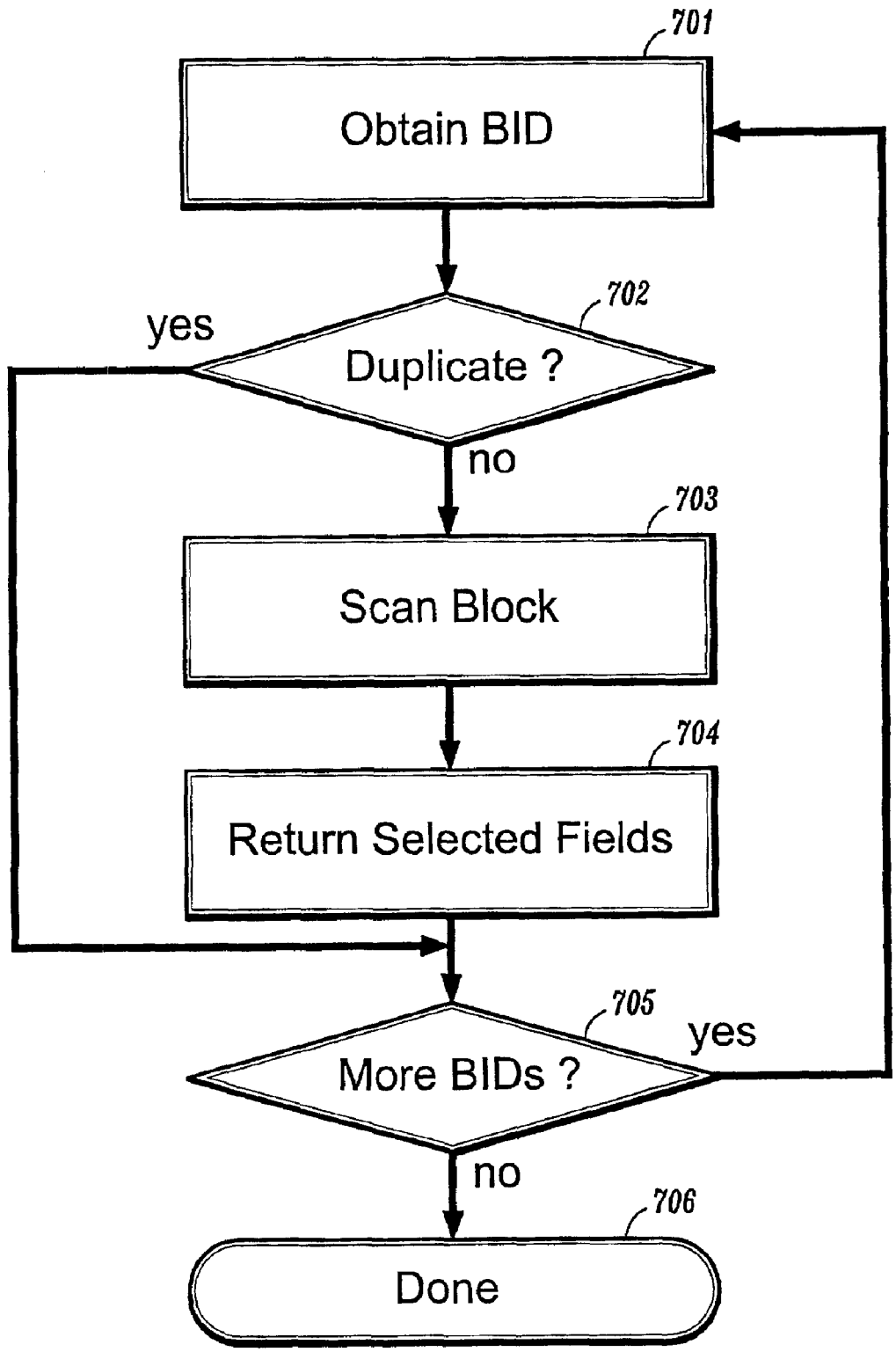
FIG. 7 is a flow diagram outlining an exemplary technique for scanning a table using a secondary block index in accordance with an embodiment of the invention.
Figure 8A:
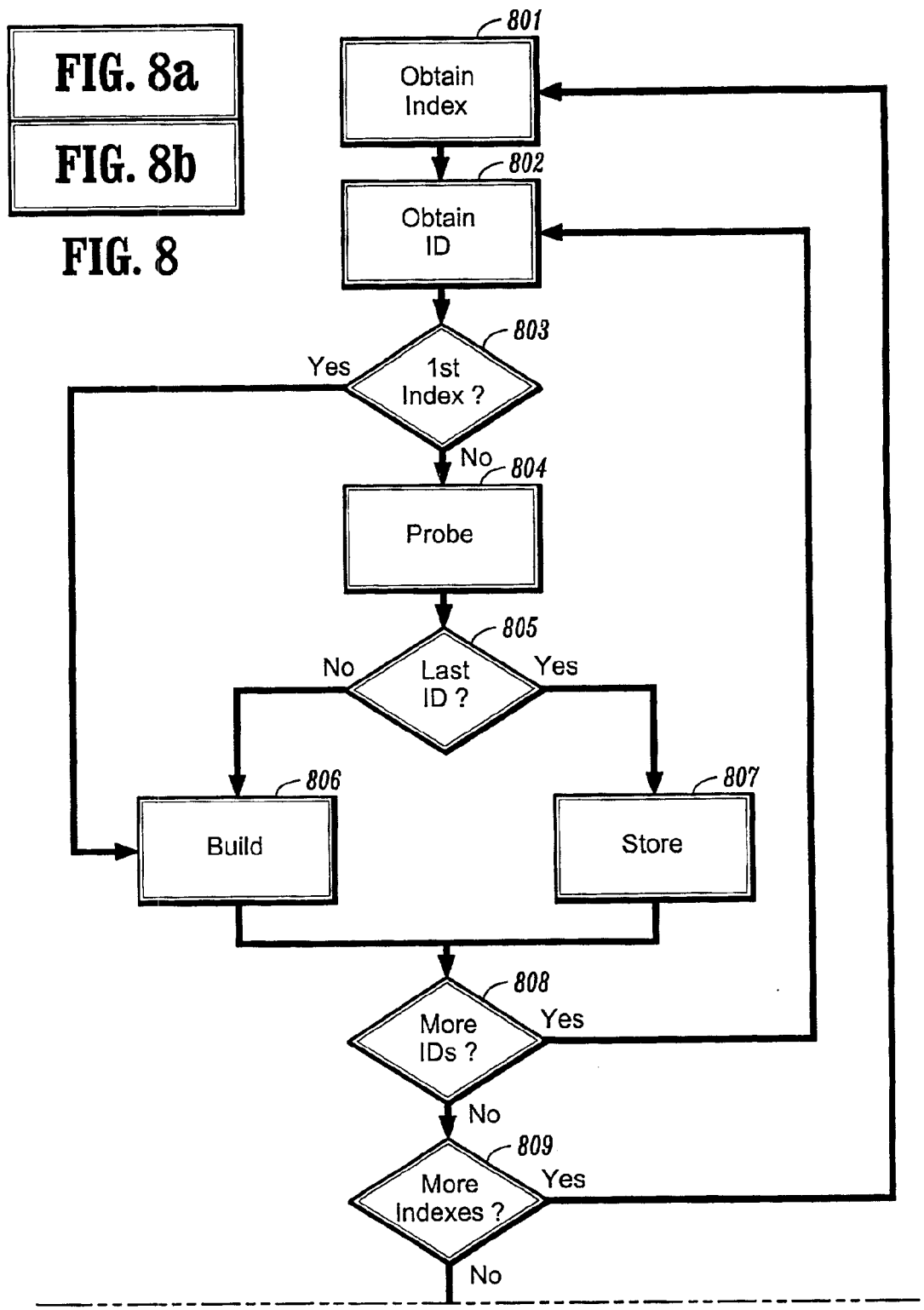
FIGS. 8a and 8b are a flow diagram outlining an exemplary technique for index ANDing using indexes of multiple granularities and types in accordance with an embodiment of the invention.
Figure 8B:
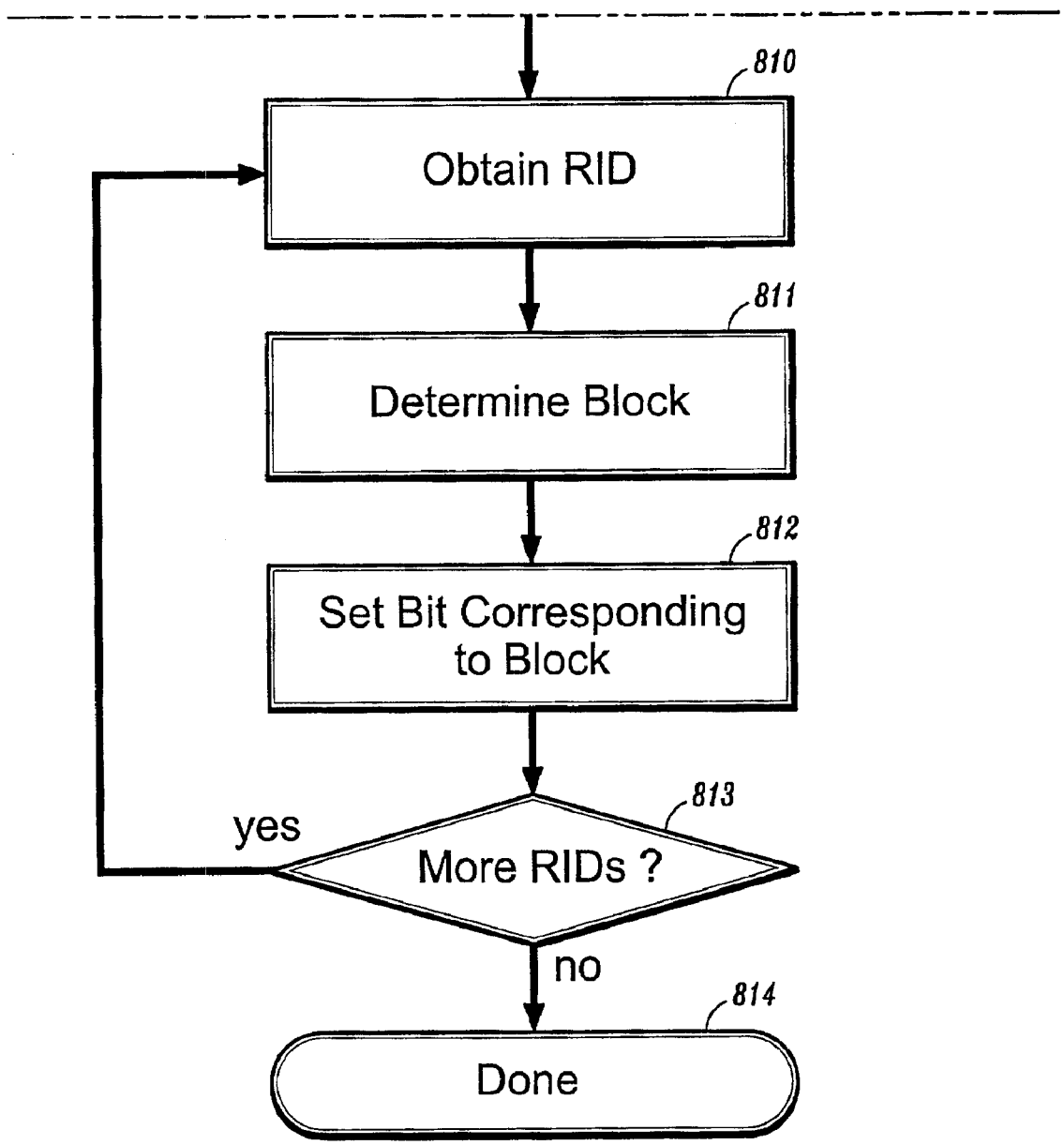
Figure 9:
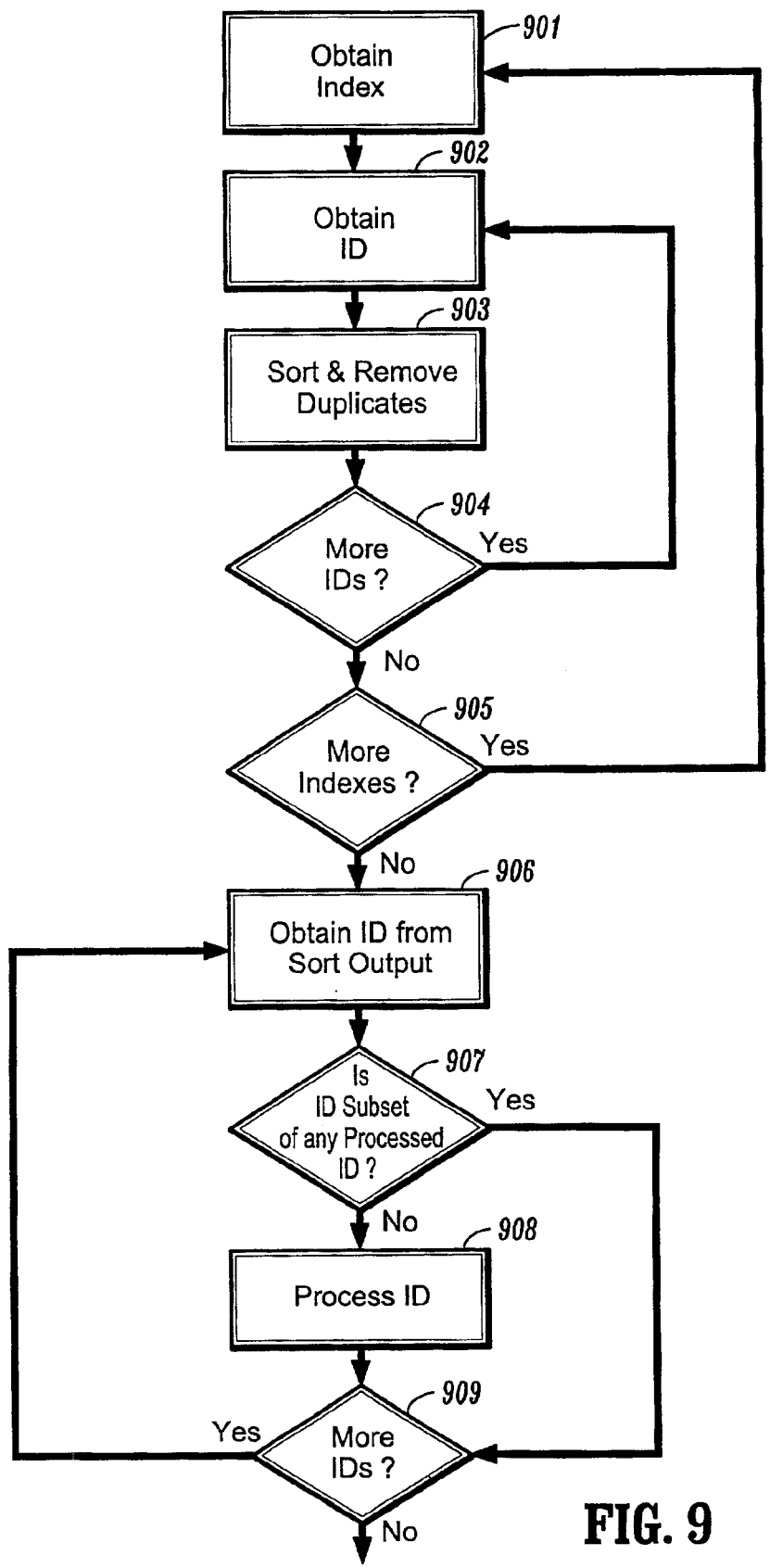
FIG. 9 is a flow diagram outlining an exemplary technique for index ORing using indexes of multiple granularities and types in accordance with an embodiment of the invention.

Queries such the one above can be processed in the following ways: (1) by a scan using a primary block index (as shown in FIG. 6), (2) by a scan using a secondary block index (as shown in FIG. 7), (3) using the technique of index ANDing, which can be performed even where the indexes are of different types and granularity (as shown in FIGS. 8(a) and 8(b)), and (4) using the technique of index ORing, which can be performed even where the indexes are of different types and granularity (as shown in FIG. 9). Furthermore, a query optimizer can use a cost model to find the best of these choices.

FIG. 6 is a flow diagram that outlines the operation of a scan using a primary block index. Consider an index scan on the blk_nation index 501 (shown in FIG. 5). At step 601, we would obtain a BID from the blk_nation index 501. Assuming that the first value in the blk_nation index 501 comprises <MEXICO: 9, 16, 25, 36, 45>, we would then proceed to step 602 to do a relational scan on block 9 which is the first BID in the list. At step 603, we would return any selected fields (e.g., orderkey where orderdate belongs to 1997 and receiptdate belongs to 1998). After processing block 9, we would check if there are any more BIDS associated with 'MEXICO', at step 604, and, if so, get the next block (which would be block 16, in the example). These steps are repeated until we have processed all blocks which belong to the key 'MEXICO'. The routine terminates at this point at step 605. Note that this kind of processing is different from a simple index scan on a RID index where we would have to access the index to get the identifier for every record and then individually process it.

FIG. 7 is a flow diagram that outlines the operation of a scan using a secondary block index. In a secondary block index, a BID could appear for more than one key. Thus, if a query requires processing blocks belonging to more than one key, we will need to ensure that a particular block does not get processed more than once. Otherwise, the query result will contain duplicate or incorrect data. Suppose there is a secondary block index on the key receiptdate with the following values:

<19970101: 1, 3, 8, 25, 71>
<19970102: 3, 8, 24, 65, 71>

It is apparent that the BIDs 3, 8 and 71 are duplicate and must be processed only once. This is accomplished by first reading all the BIDs belonging to all keys which satisfy the query (in this case, the keys '970101' and '970102') and sorting them with duplicate removal. This results in a list of distinct BIDs where no BID appears twice. This list of BIDs is processed one-by-one using a relational scan on the pages (or records) of the block as described for the simple index scan for a primary block index.

Yet another method to filter duplicate BIDs is to use a bitmap-based approach. A bitmap can be created in which each element of the bitmap corresponds to a block of a table (e.g., the nth element refers to block n). Initially, the elements of the bitmap can be set to a 'false' condition. As each block is processed, the corresponding element in the bitmap can be set to 'true'. Before processing a block, the bitmap can be consulted, and if the bitmap indicates that the block has already been processed (i.e., the element in the bitmap for the block is set to 'true'), then that block would be skipped.

Referring to FIG. 7, an exemplary technique for accomplishing the above is provided. The process receives the sorted list of BIDs. At step 701, a BID is obtained from the list. Next, at step 702, a determination is made as to whether the BID is a duplicate. If it is not a duplicate, at step 703, the block is scanned. Then, at step 704, any selected fields found for the specified value are returned. At step 705, a determination is made as to whether there are any more BIDs in the list. If so, the next one is obtained at step 701; otherwise, the process terminates at 706. If the BID was determined to be a duplicate, control would have passed instead to step 705, bypassing processing of the block associated with the BID.

FIGS. 8a and 8b are a flow diagram outlining an exemplary technique for index ANDing. In index ANDing, we combine existing indexes to answer queries for which using one existing index would not be optimum. Now that we have two new types of indexes (i.e., a primary block index and a secondary block index) and indexes of different granularity, we need new techniques to AND the various types of indexes including the RID indexes.

In the above example, if one wished to find all records having orderdate in 1997 shipped to Mexico, the blocks containing all records with orderdate in 1997 would first be determined by looking up the keys with values greater than or equal to '19970101' and less than '19980101' in the orderdate block index. Let us assume the BIDs are
{2, 4, 8, 10, 16, 20}
The BIDs are then translated into bit positions in a bitmap where a bit value of 1 means the BID which it represents has records with orderdate greater than or equal to '19970101' and less than '19980101'. For the above BIDs that qualify, a possible bitmap is 0 1 0 1 0 0 0 1 0 1 0 0 0 0 0 1 0 0 0 1 0 0 0 0 0 0 0 0 0 0 0 0 where the nth bit being 1 means that the block with BID n qualifies. This is called the Build phase.

We then scan the second block index which in this case is the nation block index, and get a list of BIDs which belong to the 'MEXICO' key value. For every BID, we check if its corresponding bit in the bitmap created in the Build phase is set to 1 or not. This is called the Probe phase. If the bit is set to 1, then, in another bitmap, the bit corresponding to that BID is set to 1. (Note that this accomplishes logical ANDing). This is then repeated for all BIDs of the nation block index which belong to the 'MEXICO' key value and whose corresponding bits in the Build phase were turned on (i.e., set to 1). So, if the BIDs for the 'MEXICO' key value are as follows
{3, 8, 16, 18, 19, 22}
then the following is a possible bitmap
0 0 0 0 0 0 0 1 0 0 0 0 0 0 0 1 0 0 0 0 0 0 0 0 0 0 0 0 0 0
0 0 with the bits corresponding to BID 8 and BID 16 being turned on. This process goes on for all indexes in the index ANDing technique, and we ultimately get a set of bits which represent blocks which have qualified if the values are set to 1. These blocks are then processed by a mini-relational scan as described before.

In the case where some of the indexes have different levels of granularity, it would be necessary to arrange indexes in granularity order (i.e., from the highest level of granularity to the lowest level of granularity), and, as each index and its qualifying values is probed, retain lower-level BIDs whose corresponding higher-level BID was found in the previous phase of the index ANDing. For example, assume there is an index for Nation and an index of lower granularity for Province. Then, to process a query for Nation='Canada' and Province='ON' and 'QB', we would process the BIDs for 'Canada' from the Nation index and then process the BIDs for 'ON' and 'QB' from the Province index in the next phase of the ANDing. Since Canada was present, BIDs for 'ON' and 'QB' would be retained.

The technique of index ANDing of block indexes can also be used with RID indexes. Here, we first perform the index ANDing of all block indexes, described above, which gives us a set of bitmap(s) that indicates which blocks have qualified so far. In the above example, it was BIDs 8 and 16. Then, we scan the first RID index and get the RIDs which qualify the index condition. For every RID we determine the block it belongs and check the set of bitmap(s) of blocks to see if the corresponding block passed the previous phase of index ANDing. If it did, then, in a new set of bitmap(s), we turn a bit corresponding to the RID on. Note that we are turning the bit corresponding to the RID on. In the previous cases, we were turning the bit corresponding to the BID on. This continues until we have consumed all RIDs which qualify the index condition. At the end of this step, we are left with bitmaps indicating which RIDs have qualified. This set of bitmap(s) is then used for further probing with any RID indexes remaining. Finally, this will result in a set of IDs which have passed the entire index ANDing. The records are fetched individually and processed.

Referring to FIGS. 8(a) and (b), an exemplary technique for accomplishing the above is provided. At step 801, an index is obtained. Then, at step 802, an identifier for the index is obtained. At step 803, a determination is made as to whether the obtained index is the first index. If it is the first index, then control passes to step 806 where a set of bitmap(s) is built. A bit in the set of bitmap(s) is set to 'true' which corresponds to the BID value (e.g., the nth bit is set to 1 for BID n). Then, control passes to step 808, where a determination is made as to whether there are any more identifiers. If there are, control passes back to step 802 where the next identifier is obtained and the process iterates. Once all the identifiers for the first index have been obtained, the set of bitmap(s) will contain a list of bits that correspond to every block associated with the first index value.

After processing the first index, at step 809, a determination is made as to whether there are more indexes. If it is determined that there are more indexes, control passes back to step 801 to obtain the next index; otherwise control terminates. Since index ANDing involves at least two indexes, processing would continue for the next index. At step 802, an identifier is obtained for the index. Then, at step 803, a determination is made as to whether the index is the first index. Since the first index was already processed, control would then pass to step 804 where the set of bitmap(s) would be probed. Probing involves examining the set of bitmap(s) to determine whether there is a bit turned on corresponding to the block identifier. Then, at step 805, a determination would be made as to whether the index is the last index. If it is not the last index, control continues to step 806 where a set of bitmap(s) is built. In this step, a bit would be set in the set of bitmap(s) if it passed the probe step. Control then continues to step 808, and the process contines as discussed. If the index is the last index, instead of building a set of bitmap(s), a final list of BIDs that have passed the ANDing operation is stored.

The flowchart shown in FIG. 8(b) is optional, and processing is performed only if there are also RID indexes to be ANDed. At step 810, a RID is obtained. Then, at step 811, the block associated with the RID is calculated. At step 812, a bit corresponding to a block in a separate set of bitmap(s) is turned on if it the bit in the set of bitmap(s) created above was set to 1. Then, at step 813, a determination is made as to whether there are any more RIDs. If there are more RIDs, control passes back to step 810 where the next RID is obtained. Otherwise, control terminates at step 814.

FIG. 9 is a flow diagram outlining an exemplary technique for index ORing. Index ORing is a technique to combine indexes that is useful in cases where answering a query using a single index will not be optimum. Index ORing of different index types (e.g., primary block index, secondary block index, and RID index) can be accomplished.

Consider a query including the condition: nation='Canada' or nation='Mexico'. Then, the nation block index can be scanned for each value and the aggregated list of blocks can be obtained by an ORing operation.

Let's assume the blocks which belong to the key value 'MEXICO' are
{2, 6, 8, 19, 23, 25}
and the blocks which belong to the key value 'CANADA' are
{2, 3, 8, 10}.
Then, the list of blocks which satisfy the conditions are
{2, 3, 6, 8, 10, 19, 23, 25}.
This list is created by combining the two lists then sorting the combined list with elimination of any duplicates. The result is a unique list of blocks which can be individually processed by mini-relational scans.

In the case where some of the indexes have different levels of granularity, it would be necessary to have the list of BIDS sorted in granularity order (i.e., from the highest level of granularity to the lowest level of granularity), and, as each index is processed, remove lower-level BIDs that belong to any higher-level BIDs that have already been processed.

Now, consider a query such as: nation='Mexico' or itemnumber <60. In this case, we will end up ORing a primary index on nation with the RID index on itemnumber. The result will be a sorted list with duplicates eliminated that includes both BIDs and RIDs which will then have to be processed. The process would have to ensure that a RID belonging to a BID that was already processed is not again processed. This could be done at run time by eliminating these RIDs from the list prior to processing.

As mentioned above, the index ORing scheme can support a secondary block index as part of its inputs. Given a secondary block index, a single BID can appear under numerous keys. Note that this is never possible in a RID index. When a secondary block index is used, it is important that a blocks be scanned just once. All records from a qualifying block should be accessed on that scan and the block should not be fetched again. This requires that the qualifying list of blocks be maintained so that duplicates can be eliminated.

Referring to FIG. 9, an exemplary technique for accomplishing the above is provided. At step 901, an index is obtained. Then, in step 902, an identifier associated with the index is obtained. The index identifier is then placed into a sort, with duplicate removal, at step 903. At step 904, a determination is made as to whether there are any more identifiers for the index. If there are, control passes back to step 902 where another index is obtained. Otherwise, control passes to step 905. At step 905, a determination is made as to whether there are any more indexes. If there are, control passes back to step 901 where the next index is obtained. Otherwise, at step 906, an identifier is obtained from the sorted output. Then, at step 907, a determination is made as to whether the identifier is a subset of a processed identifier (e.g., where a RID belongs to a BID that was already processed). If the identifier is not a subset of any processed identifier, then control passes to step 908 where the identifier is processed. Otherwise, control passes to step 909. At step 909, a determination is made as to whether there are any more identifiers left in the sorted output. If there are, control passes back to step 907; otherwise, processing terminates.

It should be appreciated that the flow diagrams shown in FIGS. 6, 7, 8(*a*) and (*b*), and 9, represent exemplary techniques to implement the basic scanning, ANDing, and ORing techniques outlined in the present invention, and that other ways to accomplish the same or substantially similar results may be accomplished by those skilled in the art. For instance, index values could be obtained and blocks scanned in any particular order, and such scanning could be done on multiple processors in parallel execution, for example. Similarly, the ANDing and ORing techniques described in this invention could be accomplished by applying logical operations on bitmaps at the machine or firmware level. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-implemented method for processing a query for information stored in a database, comprising the steps of:

obtaining index information for indexes of different types;

performing a logical operation on the index information obtained; and retrieving information from the database using the index information resulting from the logical operation.

2. The method of claim 1, wherein the indexes of different types have different granularity.

3. The method of claim 1, wherein the indexes of different types have different composition.

4. The method of claim 1, wherein at least one of the indexes of different types is a block index.

5. The method of claim 1, wherein at least one of the indexes of different types is a primary block index.

6. The method of claim 5, further comprising the step of scanning one or more blocks associated with at least one primary block index for records.

7. The method of claim 1, wherein at least one of the indexes of different types is a secondary block index.

8. The method of claim 7, further comprising the step of scanning one or more blocks associated with at least one secondary block index for records.

9. The method of claim 8, wherein the step of scanning further comprises the step of checking whether a block to be scanned is a duplicate and not scanning the block if it is a duplicate.

10. The method of claim 4, wherein the step of performing a logical operation comprises performing an index ANDing operation.

11. The method of claim 10, wherein the step of performing an index ANDing operation comprises the steps of:

(a) building a set of block indicators for a list of block identifiers associated with a first block index;

(b) probing the last built set of block indicators using a next list of block identifiers associated with a next block index;

(c) building a set of block indicators based on the results of the probing;

(d) repeating steps (b) and (c) until there are no more remaining block indexes to be evaluated but not performing step (c) when the last index is evaluated; and (e) identifying blocks to be processed.

12. The method of claim 10, wherein the step of performing an index ANDing operation comprises the steps of:

(a) building a set of block indicators for a list of block identifiers associated with a first block index;

(b) probing the last built set of block indicators using a next list of block identifiers associated with a next block index;

(c) building a set of block indicators based on the results of the probing;

(d) repeating steps (b) and (c) until there are no more remaining block idees to be evaluated but not performing step (c) when the last index is evaluated;

(e) creating a list of block identifiers in which each block identifier in the list corresponds to a block associated with a record identifier in a list of record identifiers;

(f) creating a set of record indicators whose corresponding blocks in the list of block identifiers created in step (e) are also indicated in the last built set of block indicators; and (g) identifying blocks and records to be processed.

13. The method of claim 4, wherein the step of performing a logical operation comprises performing an index ORing operation.

14. The method of claim 13, wherein the step of index ORing further comprises the steps of:

(a) obtaining lists of block identifiers;

(b) combining the lists of block identifiers into a combined list;

(c) sorting the combined list; and (d) removing from the combined list duplicate block identifiers along with any block identifier belonging to blocks of lower-level granularity whose corresponding block identifier of a higher-level granularity exists.

15. The method of claim 14, further comprising the steps of:
(e) obtaining a list of one or more record identifier;
(f) removing record identifiers from the list of one or more record identifier where a block identifier associated with a record identifier in the list of one or more record identifier matches a block identifier contained in the sorted list determined in step (d); and
(g) removing duplicate record identifiers from the list of record identifiers.

16. The method of claim 1, wherein at least one of the indexes of different types is a record-based index.

17. The method of claim 1, wherein at least one of the indexes of different types is a partition-based index.

18. The method of claim 1, wherein the step of retrieving information from a database comprises developing a query plan based on a cost model and processing the query according to the query plan.

19. The method of claim 1, wherein at least one table associated with the database is indexed using block indexes having different granularity.

20. A program storage device readable by a machine, tangibly embodying a program of instructions executable on the machine to perform method steps for processing a query for information stored in a database, the method steps comprising:
obtaining index information for indexes of different types;
performing a logical operation on the index information obtained; and
retrieving information from the database using the index information resulting from the logical operation.

21. The program storage device of claim 20, wherein the indexes of different types have different granularity.

22. The program storage device of claim 20, wherein the indexes of different types have different composition.

23. The program storage device of claim 20, wherein at least one of the indexes of different types is a block index.

24. The program storage device of claim 20, wherein at least one of the indexes of different types is a primary block index.

25. The program storage device of claim 24, further comprising the step of scanning one or more blocks associated with at least one primary block index for records.

26. The program storage device of claim 20, wherein at least one of the indexes of different types is a secondary block index.

27. The program storage device of claim 26, further comprising the step of scanning one or more blocks associated with at least one secondary block index for records.

28. The program storage device of claim 27, wherein the step of scanning further comprises the step of checking whether a block to be scanned is a duplicate and not scanning the block if it is a duplicate.

29. The program storage device of claim 23, wherein the step of performing a logical operation comprises performing an index ANDing operation.

30. The program storage device of claim 29, wherein the step of performing an index ANDing operation comprises the steps of:
(a) building a set of block indicators for a list of block identifiers associated with a first block index;
(b) probing the last built set of block indicators using a next list of block identifiers associated with a next block index;
(c) building a set of block indicators based on the results of the probing;
(d) repeating steps (b) and (c) until there are no more remaining block indexes to be evaluated but not performing step (c) when the last index is evaluated; and
(e) identifying blocks to be processed.

31. The program storage device of claim 29, wherein the step of performing an index ANDing operation comprises the steps of:
(a) building a set of block indicators for a list of block identifiers associated with a first block index;
(b) probing the last built set of block indicators using a next list of block identifiers associated with a next block index;
(c) building a set of block indicators based on the results of the probing;
(d) repeating steps (b) and (c) until there are no more remaining block indexes to be evaluated but not performing step (c) when the last index is evaluated;
(e) creating a list of block identifiers in which each block identifier in the list corresponds to a block associated with a record identifier in a list of record identifiers;
(f) creating a set of record indicators whose corresponding blocks in the list of block identifiers created in step (e) are also indicated in the last built set of block indicators; and
(g) identifying blocks and records to be processed.

32. The program storage device of claim 23, wherein the step of performing a logical operation comprises performing an index ORing operation.

33. The program storage device of claim 32, wherein the step of index ORing further comprises the steps of:
(a) obtaining lists of block identifiers;
(b) combining the lists of block identifiers into a combined list;
(c) sorting the combined list; and
(d) removing from the combined list duplicate block identifiers along with any block identifier belonging to blocks of lower-level granularity whose corresponding block identifier of a higher-level granularity exists.

34. The program storage device of claim 33, further comprising the steps of:
(e) obtaining a list of one or more record identifier;
(f) removing record identifiers from the list of one or more record identifier where a block identifier associated with a record identifier in the list of one or more record identifier matches a block identifier contained in the sorted list determined in step (d); and
(g) removing duplicate record identifiers from the list of record identifiers.

35. The program storage device of claim 20, wherein at least one of the indexes of different types is a record-based index.

36. The program storage device of claim 20, wherein at least one of the indexes of different types is a partition-based index.

37. The program storage device of claim 20, wherein the step of retrieving information from a database comprises developing a query plan based on a cost model and processing the query according to the query plan.

38. The program storage device of claim 20, wherein at least one table associated with the database is indexed using block indexes having different granularity.

* * * * *